United States Patent Office 3,524,739
Patented Aug. 18, 1970

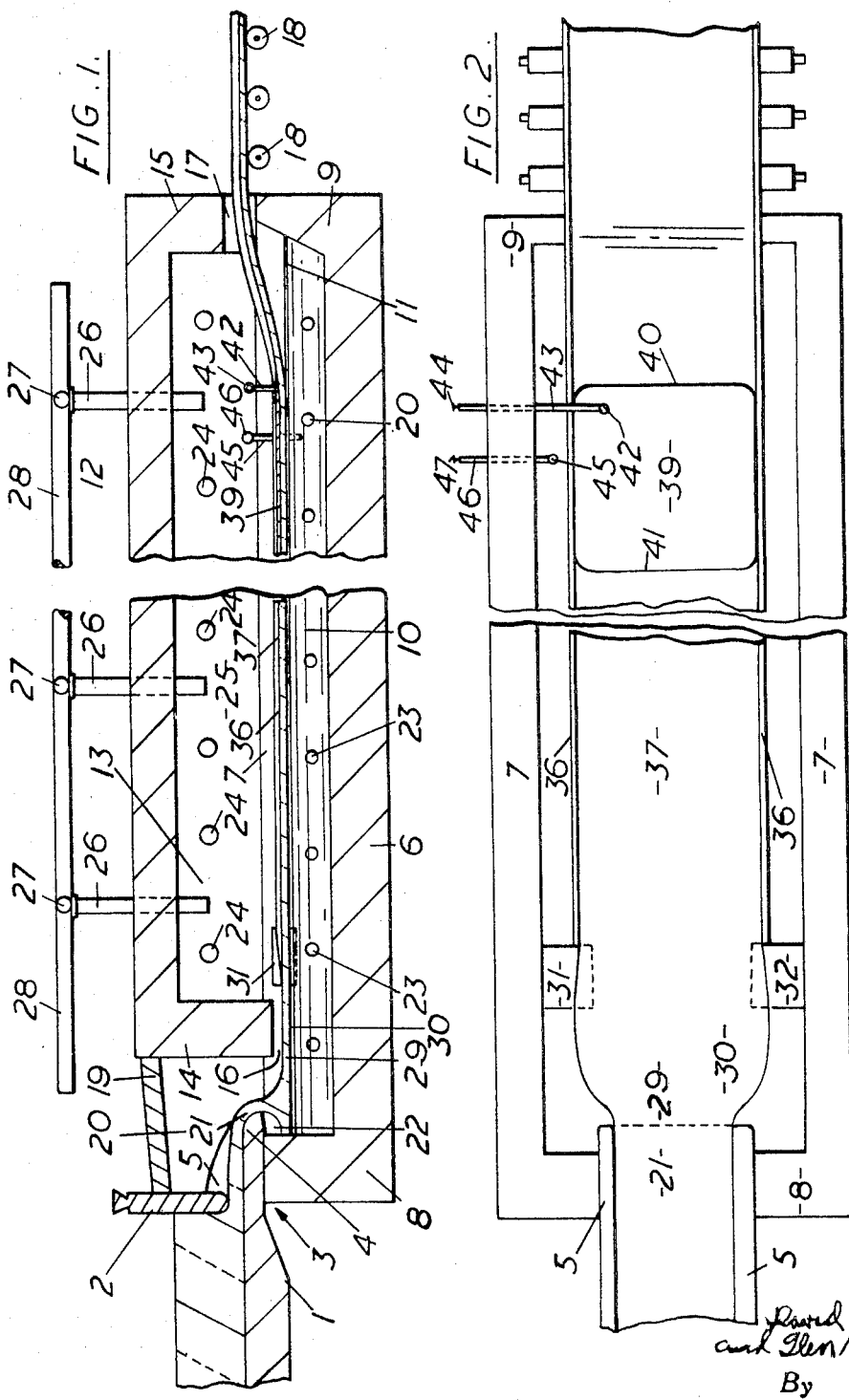

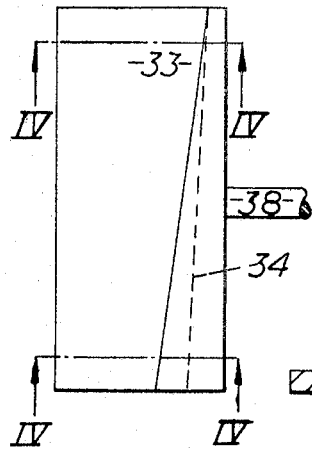
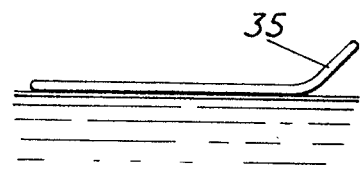
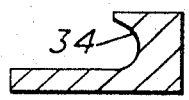
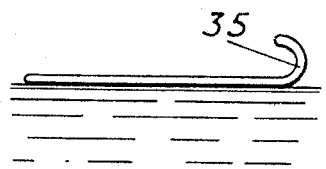
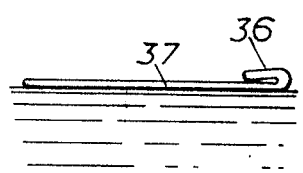
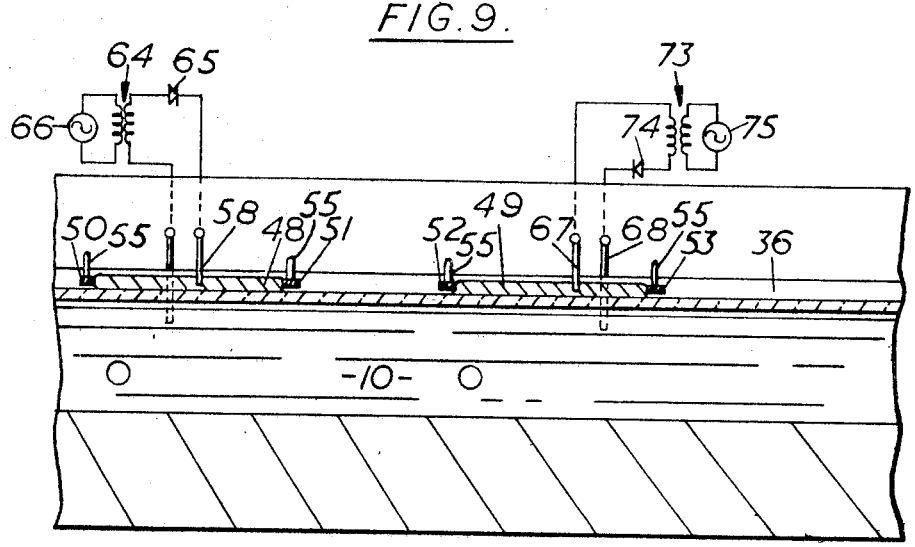

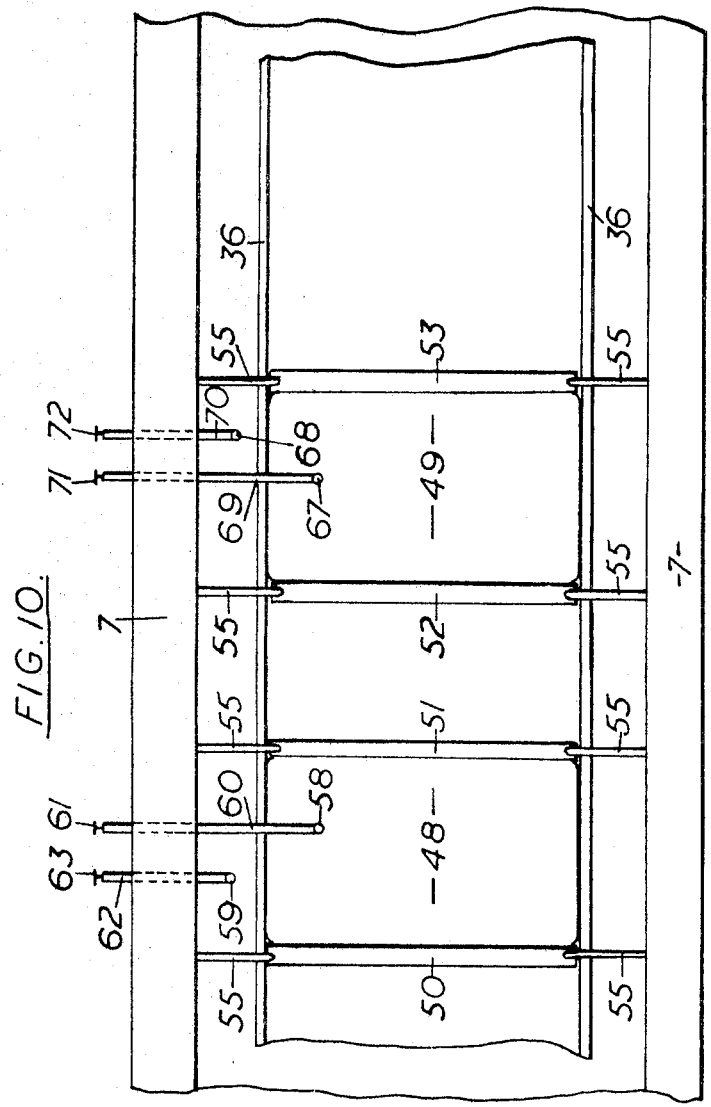

3,524,739
APPARATUS FOR THE MANUFACTURE AND
SURFACE MODIFICATION OF FLAT GLASS
David Gordon Loukes, Prescot, and Glen Nightingale,
Rainford, England, assignors to Pilkington Brothers
Limited, Liverpool, England, a corporation of Great
Britain
Original application July 6, 1966, Ser. No. 563,138, now
Patent No. 3,467,508. Divided and this application
Mar. 25, 1969, Ser. No. 810,294
Claims priority, application Great Britain, July 9, 1965,
29,288/65
Int. Cl. C03b 18/00
U.S. Cl. 65—182　　　　　　　　　　　　　　6 Claims

ABSTRACT OF THE DISCLOSURE

Flat glass manufacturing apparatus including a tank holding a bath of molten metal along which a layer of glass is advanced in molten form, means for shaping the margins of an advancing ribbon of glass to provide a trough for maintaining a pool of molten material on top of the glass, and means for passing an electric current through the glass between the pool and the bath.

CROSS REFERENCES TO RELATED APPLICATIONS

This application is a division of our copending applications Ser. No. 563,138, filed July 6, 1966, now U.S. Pat. 3,467,508.

BACKGROUND OF THE INVENTION

This invention relates to the manufacture of flat glass and more especially to the manufacture of flat glass during which glass is in contact with molten metal, for example during which glass is supported on a molten metal surface such as the surface of a bath of molten metal which is so constituted as to have all the characteristics fully described in U.S. Pat. No. 2,911,759.

It is a main object of the present invention to provide improved apparatus for the manufacture of flat glass having desired surface characteristics.

SUMMARY

According to the invention apparatus for use in the manufacture of flat glass having desired surface characteristics comprises a tank structure containing a bath of molten metal, means for delivering glass at a controlled rate to the bath and for advancing the glass along the bath as a layer of molten glass in ribbon form, thermal regulators for controlling the viscosity of the glass so as to ensure that the glass is gradually cooled as it is advanced until it is sufficiently stiffened to be taken unharmed from the bath, means for maintaining a pool of molten material on top of the glass and for preventing forward movement of the pool with the glass, electrodes arranged to dip into the pool of molten material and into the bath of molten metal, and an electric current supply circuit connected to said electrodes.

BRIEF DESCRIPTION OF THE DRAWINGS

FIG. 1 is a sectional elevation of apparatus according to the invention including a tank structure containing a bath of molten metal, a roof structure over the tank structure and apparatus for pouring molten glass on to the bath, FIG. 2 is a plan view of the apparatus of FIG. 1 but with the roof structure removed, FIG. 3 is a plan view of an edge forming tool for shaping the margins of the ribbon, two such tools being employed in the apparatus of FIGS. 1 and 2, FIG. 4 is a section on line IV—IV of FIG. 3, FIG. 5 is a section through one margin of the ribbon of glass showing the first stage of the shaping of that margin by the part of the tool illustrated in FIG. 4, FIG. 6 is a section on line VI—VI of FIG. 3, FIG. 7 is a section through the margin of the ribbon showing the shape produced by the part of the tool illustrated in FIG. 6, FIG. 8 is a section through the final form of one margin of the ribbon of glass, FIG. 9 is a sectional elevation through a part of the tank structure showing the application of the invention to a method in which two separated pools of molten metal are confined on the top surface of the ribbon of glass, and FIG. 10 is a plan view of the apparatus of FIG. 9.

DESCRIPTION OF THE PREFERRED EMBODIMENTS

Referring to FIGS. 1 and 2 of the drawings, a forehearth of a continuous glass melting furnace is indicated at 1 and a regulating tweel at 2. The forehearth ends in a spout 3 comprising a lip 4 and side jambs 5, one of which is shown in FIG. 1. The lip 4 and side jambs 5 together constitute a spout of generally rectangular cross-section.

The spout 3 is disposed above the floor 6 of an elongated tank structure including side walls 7 joined together to form an integral structure with the floor 6, an end wall 8 at the inlet end of the tank, and an end wall 9 at the outlet end of the tank. The tank structure holds a bath of molten metal 10 whose surface level is indicated at 11. The bath is, for example, a bath of molten tin or of an alloy of tin in which tin predominates and the bath has a specific gravity greater than that of glass.

A roof structure is supported over the tank structure and the roof structure includes a roof 12, side walls 13 and integral end walls 14 and 15 respectively at the inlet and outlet ends of the bath. The inlet end wall 14 extends downwardly close to the surface 11 of the molten metal to define with that surface an inlet 16 which is restricted in height and through which molten glass is advanced as will be described below. The outlet end wall 15 of the roof structure defines with the outlet end wall 9 of the tank structure an outlet 17 through which the ultimate ribbon of glass produced on the bath is discharged on to driven conveyor rollers 18 mounted outside the outlet end of the tank and disposed somewhat above the level of the top of the end walls 9 of the tank structure so that the ribbon is lifted clear of the wall 9 for discharge through the outlet 17.

The rollers 18 convey the ribbon of glass to an annealing lehr in well known manner and also apply tractive effort to the ribbon of glass to assist in advancing the ribbon as it glides along the surface of the bath 10.

An extension 19 of the roof 12 extends up to the tweel 2 and forms a chamber with side walls 20 in which chamber the spout 3 is disposed.

Molten soda/lime/silica glass 21 is poured on to the bath 10 of molten metal from the spout 3 and the tweel 2 regulates the rate of flow of the molten glass 21 over the spout lip 4. The spout is vertically spaced from the surface 11 of the bath so that the molten glass 21 has a free fall of a few inches, exaggerated in FIG. 1, to the bath surface. This free fall is such as to ensure the formation of a heel 22 of molten glass behind the glass 21 pouring over the spout, which heel 22 extends up to the inlet end wall 8 of the tank structure.

The temperature of the glass as it is advanced along the bath is regulated from the inlet end down to the discharge end by thermal regulators 23 immersed in the bath 10, and thermal regulators 24 mounted in the headspace 25 which is defined over the bath by the roof structure. A protective gas is supplied to the headspace through ducts 26 which are provided at intervals in the roof 12. The ducts 26 are connected by branches 27 to a header 28 which is connected to a supply of protective gas. Thus a plenum of protective gas is maintained in the headspace 25 which is a substantially closed headspace and there is outward flow of protective gas through the inlet 16 and the outlet 17.

The temperature of the molten glass is regulated by the thermal regulators 23 and 24 as the glass is advanced along the bath so as to ensure that a layer of molten glass 29 is established on the bath. This layer 29 is advanced along the bath through the inlet 16 and as it is advanced there is free lateral flow of the molten glass under the influence of surface tension and gravity until there is developed from the layer 29 a buoyant body 30 of molten glass, which is then advanced in ribbon form along the bath.

The width of the tank structure at the surface level 11 of the bath is greater than the width of the buoyant body 30 of molten glass so that there is no limitation to the initial free lateral flow of the molten glass.

The margins of the ribbon are shaped as it is further advanced to form the ribbon into a shallow trough or channel in order that molten electrically conductive material may be contained laterally on the upper surface of the ribbon of glass and completely isolated from the molten metal bath. One way of shaping the margins of the ribbon of glass to produce the shallow channel is illustrated diagrammatically in FIGS. 1 and 2 and in greater detail with reference to FIGS. 3 to 8. Two edge forming tools 31 and 32 of a material which is not wetted by molten glass, for example carbon in the form of graphite, are mounted at opposite sides of the tank structure.

The tools may be water-cooled if desired and are partially immersed in the molten metal of the bath, as shown in FIG. 1.

The tools have specially shaped forming surfaces for engagement by the margins of the ribbon of glass. The tools are a mirror image of each other and a plan view of the tools 31 is shown in FIG. 3. The shape of the forming surface of the tool gradually changes from an upward slope 33 as illustrated in FIG. 4 to an inwardly directed curve as shown at 34 in FIG. 6.

As the buoyant body of molten glass 30 is advanced in ribbon form the margins of the ribbon first ride on to the upwardly sloping parts 33 of the tools 31 and 32 and are bent to the formation shown in FIG. 5 which illustrates one margin 35 of the ribbon of glass having an upward slope matching the initial slope 33 of the tool. Thereafter the slope 33 of each tool gradually curls over to assume the shape shown at 34 so that the margins 35 of the ribbon are both gradually folded up and over as the ribbon is advanced, and by the time the margins of the ribbon pass beyond the downstream ends of the tools 31 and 32 they have collapsed to the folded formation shown at 36 in FIG. 8. This folded formation therefore produces marginal ridges along both edges of the ribbon which give to the ribbon a shallow trough-like configuration which enables molten material to be confined on the top surface of the ribbon of glass 37 as it is advanced along the bath of molten metal. The height of the marginal ridge 36 formed along one edge of the ribbon of glass 37 is exaggerated in FIG. 1 for the sake of clarity.

The edge forming tools 31 and 32 are preferably cooled and a composite pipe 38 for supplying cooling water to the tool 31 and for exhausting the water is indicated in FIG. 3. The margins of the glass lose heat to the forming tools so that the marginal ridges 36 which are formed are sufficiently stiffened to hold their form when the ribbon of glass 37 is advanced downstream of the tools.

In an alternative embodiment of the invention glass may be delivered to the bath 10 at a controlled rate as a formed ribbon of glass which is advanced on to the bath from casting rollers associated with the inlet 16 to the bath. The casting rollers both deliver glass in ribbon form to the bath and advance the ribbon along the bath towards the outlet end thereof. The casting process for delivering a formed ribbon of glass to the bath may be elaborated by forming marginal ridges on the ribbon of glass before it is delivered to the bath.

The present invention is concerned with surface treatment of the ribbon of glass as it is advanced along the surface of the bath of molten metal in order to impart desired surface characteristics to the glass. Near the outlet end of the bath where the temperature of the glass is in the region of 750° to 600° C. a body of molten electrically conductive material 39, e.g. a pool of molten metal, is confined on the top surface of the glass. The sides of the pool 39 are contained laterally by the marginal ridges 36 and forward movement of the downstream edge 40 of the pool with the glass is inhibited by the upward slope of the ribbon of glass as it is lifted from the bath surface for discharge through the outlet 17.

In the embodiment of FIGS. 1 and 2 the quantity of molten material in the pool 39 is such that the pool finds its own equilbrium thickness on the top surface of the glass, which in the case of molten tin or a molten tin alloy in which tin predominates is about ¼ inch, and the upstream edge 41 of the pool remains stationary relative to the tank structure as the ribbon of glass is advanced underneath the pool.

The material 39 may be a pool of molten tin or a pool of a molten tin alloy for example an alloy of tin with lithium, sodium, potassium, zinc, magnesium, aluminium, silicon, titanium, manganese, chromium or iron. Alternatively the alloy may be an alloy of tin with one of the rare earth metals.

The upstream edge 41 of the pool 39 may be held, for example by a carbon barrier extending across the ribbon surface just above the surface but without touching the surface. This barrier prevents the molten material 39 from flowing along the ribbon surface contrary to the direction of movement of the ribbon, and the gap between the bottom of the carbon barrier and the surface of the glass is so small that surface tension prevents the molten material from escaping through the gap.

Other ways may be employed for confining the pool of molten material on the ribbon surface, for example the edges of the ribbon may be raised on carbon skids which are held in the bath surface at the sides of the bath so that the production of marginal ridges 36 would not be necessary.

An electrode 42 carried on a conducting support rod 43 dips into the surface of the pool 39 of molten material. The electrode 43 may be a carbon electrode or an osmium tipped copper electrode. The rod 43 passes through the side wall 7 of the tank structure and has a terminal 44 fixed to it. A second electrode 45 is similarly mounted on a connecting rod 46 which is shorter than the rod 43 and ends in a terminal 47. The electrode 45 dips into the molten metal bath alongside that part of the ribbon on which the pool 39 is confined. The support rods 43 and 46 are insulated from the tank structure.

The lateral containing of the sides of the pool 39 obviates any possibility of short-circuiting between the confined pool and the bath of molten metal and through the electrodes 42 and 45 electrical contact is made with that part of the upper surface of the ribbon of glass which is supporting the pool 39 of molten material, and with the whole of the bottom surface of the ribbon of glass supported on the bath of molten metal. The terminals 44 and 47 are connected to a direct current supply in such manner that the pool of molten tin 39 on the glass acts as an anode and the molten metal bath 10 acts as a cathode.

A direct current of, for example 50 amps. at a voltage of the order of 50 volts is provided by the supply circuit and this current passing through the thickness of the glass causes tin to migrate electrolytically from the pool 39 into the top surface of the ribbon of glass. The current which is passed through the ribbon in order to produce a desired change in the surface characteristics of the top surface depends on the speed, in square inches per second, at which the ribbon of glass is being advanced. The amount of tin which enters a given square inch of the top surface of the glass depends also on the temperature and thickness of the glass and the applied voltage.

In one method of operating, the length of the pool 39 is such that the ribbon of glass takes about 60 seconds to pass under the confined pool of tin, the resulting surface concentration of tin in the top surface of the ribbon which is achieved being such that the ribbon taken from the bath has something of a metallic appearance.

The treated glass which is thus produced has unusual heat reflecting and light transmitting properties and is not easily wetted by water, as well as having special chemical properties. After the ribbon of glass has been annealed, the margins are trimmed off leaving a ribbon of flat glass having the desired surface characteristics.

The amount of tin migrating into the surface of the glass may be in the region of 1 milligram of tin per square inch of the glass surface, and with such a concentration of tin in the surface the glass noticeably transmits less light. If a yet higher current is passed through the glass there is a resulting surface concentration of tin in the glass in the region of several milligrams of tin per square inch and an iridescent grey surface is produced.

The arrangement illustrated in FIGS. 1 and 2 gives a relatively shallow surface treatment. If a deeper surface treatment of the glass is desired then the method of the invention may be applied higher up the bath, where the glass is hotter but is not so hot that its upper surface is affected by the weight of the pool of molten material acting on it.

Metal from the bath may be caused to enter the bottom surface of the ribbon of glass by reversing the electrical connections to the terminals 44 and 47. The molten metal bath then acts as an anode and the pool 39 of molten metal acts as a cathode, and the bath metal, e.g. tin, lead or bismuth is carried electrolytically into the bottom surface of the glass ribbon. The migration of metal into the glass takes place mainly into that part of the bottom of the ribbon which is directly underneath the pool 39 of molten metal.

The use of tin alloys for the pool 39 has already been mentioned, and by using different alloys other surface finishes may be obtained for the ribbon of glass.

Alloys of bismuth or lead may be used for the pool 39, for example alloys of bismuth or lead with any one of the following elements, namely lithium, sodium, zinc, magnesium, aluminum, silicon, titanium, manganese, chromium, iron, cobalt, nickel, copper, silver, gold, antimony, arsenic and indium; or with a metal of the platinum group, that is platinum, palladium, ruthenium, rhodium, osmium, or iridium; or with a rare earth metal.

In particular alloys based on bismuth or lead can be employed for causing a colouring element to enter the top surface of the glass. For example the top surface of the glass may be stained yellow by employing a pool of a silver/bismuth alloy, or may be stained grey by a pool of nickel/bismuth alloy. A red colour is obtained by employing a pool of a copper/bismuth or a copper/lead alloy, especially if the top surface of the glass has already been reduced by hydrogen present in the headspace over the bath, or if a reducing agent has previously been introduced into the top surface of the glass in the manner described herein with reference to FIGS. 9 and 10. A pool of a bismuth/copper/tin alloy in correct proportions may be employed to introduce both copper and tin simultaneously into the glass surface whereupon a red colour is produced.

Elements other than the molten metal of the bath may be caused to migrate into the bottom surface of the ribbon of glass by maintaining in the molten bath a requisite concentration of the desired element so that with the bath as the anode the electrolytic action causes the element to move from the bath in a controlled manner into the bottom surface of the ribbon of glass.

A pool of electrically conductive molten salt may be confined on the top surface of the ribbon of glass. For example a high surface concentration of silver may be produced in the ribbon of glass by confining a layer of a molten silver halide, for example silver chloride, on the top of the glass near the outlet end of the bath of molten metal as illustrated in FIGS. 1 and 2, and then passing a controlled electric current through the glass with the pool of silver chloride acting as the anode. Copper or zinc may be caused to migrate electrolytically into the glass from a pool of a molten copper salt or a molten zinc salt confined on the upper surface of the ribbon of glass.

In the embodiments described above direct current is employed but it has been found that an alternating current may be used, for example a current alternating at about 1 cycle per second, to cause tin to enter preferentially into one surface of the glass.

A heating alternating current at mains frequency may be superimposed on the controlled direct electric current in order to cause electrical heating of the glass thereby enhancing the controlled migration of an element into the glass surface.

FIGS. 9 and 10 illustrate a form of apparatus according to the invention for modifying both surfaces of the ribbon of glass. Two molten pools 48 and 49 are separately confined on the top of the ribbon of glass being separated by a sufficient distance to ensure that the pools are electrically isolated from each other. The marginal ridges 36 formed on the ribbon of glass contain the side edges of the pools laterally and the upstream and downstream edges of the pools are held by means of carbon barriers. There are two such barriers 50 and 51 holding the front and rear edges of the pool 48, and two similar barriers 52 and 53 holding the front and rear edges of the pool 49. The carbon barriers 50 to 53 are individually and adjustably supported by means of struts 55 between the side walls of the tank structure. The mounting of the barriers 50 to 53 permits both vertical and longitudinal adjustment of the barriers relative to the tank structure.

Associated with the pool 48 there are two electrodes 58 and 59 which respectively dip into the top surface of the pool 48 and into the molten metal bath 10 alongside the pool 48. The electrode 58 is mounted on an insulated connecting rod 60 fixed in the tank side wall 7 and carrying a terminal 61. The electrode 59 is carried on an insulated connecting rod 62 which has a terminal 63. The terminal 63 is connected to one end of the secondary winding of a transformer 64 and the terminal 61 is connected to the other end of that secondary winding through a rectifier 65. The primary winding of the transformer 64 is connected to a source 66 of alternating current.

Similarly the pool 49 has associated electrodes 67 and 68 respectively dipping into the pool 49 and into the molten metal bath 10 alongside the pool. The electrodes 67 and 68 are carried on insulated connecting rods 69 and 70 having terminals 71 and 72. As shown in FIG. 9 the terminal 71 is connected to one end of the secondary winding of a transformer 73 and the terminal 72 is connected through a rectifier 74 to the other end of that secondary winding. The primary winding of the transformer 73 is connected to a power supply source 75. By the use of this method of electrical connection the pool 48 acts as an anode with respect to the molten metal bath 10, and the pool 49 acts as a cathode with respect to the bath 10. Thus metal will enter the top surface of the ribbon of glass from the pool 49 and will enter the bottom surface of the ribbon of glass from the bath 10 as the ribbon passes under the pool 49 so that the ultimate ribbon of glass produced has a predetermined concentration of metal in both surfaces. This method could be employed in a process in which the pool 48 is a pool of lithium/tin alloy, the pool 49 is a pool of tin, and a predetermined concentration of lithium is alloyed with the tin of the bath 10. Lithium enters both surfaces of the ribbon and the glass can be strengthened by subsequent ion exchange reactions involving the lithium ions.

In another application of the twin-pool embodiment of the invention zinc is introduced into the surfaces of the glass in controlled amounts from a tin/zinc alloy in order to improve the weathering properties of the glass.

Both the pools 48 and 49 may have the same polarity with respect to the bath 10 in another application of the invention to a two stage treatment of the top surface of the glass. For example both the pools may be connected as anodes, the first pool being of tin or an arsenic/bismuth alloy, and the second pool being of a copper/bismuth alloy or a copper/lead alloy. A reducing agent is introduced into the top surface of the glass from the first pool, and the copper entering the glass from the second pool is reduced to give a red colour to the glass.

The metal alloyed with the tin, lead or bismuth may be continually replenished by electrolysis from a pool of the salt of that metal which floats on top of the pool of molten metal. For example the lithium in a lithium/tin alloy may be continually replenished from a pool of lithium salt which is floated on the pool of alloy.

The effect of the surface treatment of the glass may be graduated across the ribbon of glass by shaping the top pool or pools of molten metal to a non-uniform width or length. For example a laterally graded top surface treatment of the ribbon is achieved by holding the leading edge of the pool 39 of FIGS. 1 and 2 at an angle to the direction of advance of the ribbon of glass by means of a carbon barrier.

Additionally longitudinally graded top or bottom surface treatment of the glass may be produced by continuously varying the applied voltage and hence the current flowing through the glass.

We claim:

1. Apparatus for use in the manufacture of flat glass having modified surface characteristics, comprising a tank structure containing a bath of molten metal, means for delivering glass at a controlled rate to the bath and for advancing the glass along the bath as a layer of molten glass in ribbon form, thermal regulators for controlling the viscosity of the glass so as to ensure that the glass is gradually cooled as it is advanced until it is sufficiently stiffened to be taken unharmed from the bath, means for maintaining a pool of molten material in contact with the upper surface of the glass and for preventing forward movement of the pool with the glass, electrodes dipping respectively into such a pool of molten material and into the bath of molten metal, and an electric current supply circuit connected to said electrodes.

2. Apparatus according to claim 1, including thermal regulators for controlling the viscosity of the glass so as to ensure that the layer of glass is advanced in a plastic state, edge shaping means mounted relative to the tank side walls for shaping the margins of the ribbon of glass so that the ribbon assumes a shallow trough-like configuration, and means for maintaining the pool of molten material in said trough.

3. Apparatus according to claim 2, wherein the edge shaping means comprises a pair of edge forming tools of non-wettable material mounted opposite each other at the sides of the tank, the tools having shaped forming surfaces which engage the edges of the ribbon of glass, which surfaces fold the edges of the ribbon up and over to form ridges along the margins of the ribbon of glass.

4. Apparatus according to claim 1, including at least one carbon barrier extending across and above the path of travel of the ribbon of glass, and means for fixing said barrier to the tank structure in a position to engage the downstream edge of said pool of molten material to prevent forward movement of the pool with the glass.

5. Apparatus according to claim 1, including two pairs of carbon barriers extending across and above the path of travel of the ribbon of glass, means for fixing each barrier to the tank structure so that each pair of barriers defines the upstream and downstream edges of a pool of molten metal defined on the upper surface of the glass, the pairs of barriers being separated by a distance such that the two confined pools are electrically isolated from each other, and an electrode associated with each pair of barriers and dipping into the pool confined by those barriers.

6. Apparatus for use in the manufacture of flat glass having modified surface characteristics, comprising a tank structure containing a bath of molten metal, means for delivering glass at a controlled rate to the bath and for advancing the glass along the bath as a layer of molten glass in ribbon form, thermal regulators for controlling the viscosity of the glass so as to ensure that the layer of glass is advanced in a plastic state and for controlling the viscosity of the glass so as to ensure that the glass is gradually cooled as it is advanced until it is sufficiently stiffened to be taken unharmed from the bath edge shaping means mounted relative to the tank side walls for shaping the margins of the ribbon of glass so that the ribbon assumes a shallow trough-like configuration, means for maintaining a pool of molten electrically-conductive material in said trough and contacting the upper surface of the glass, electrodes dipping respectively into such a pool of molten material and into the bath of molten metal, and an electric current supply circuit connected to said electrodes.

References Cited

UNITED STATES PATENTS

| 3,445,213 | 5/1969 | Long | 65—182 XR |
| 3,467,508 | 9/1969 | Loukes et al. | 65—182 XR |

FOREIGN PATENTS 620,787  7/1962  Belgium.

S. LEON BASHORE, Primary Examiner

J. H. HARMAN, Assistant Examiner

U.S. Cl. X.R.

65—30, 99